United States Patent
Sun

(10) Patent No.: US 8,455,052 B2
(45) Date of Patent: Jun. 4, 2013

(54) METHOD FOR MANUFACTURING HAIRLINE ELEMENTS IN CASE FRAMES

(75) Inventor: Jae-Sung Sun, Gyeonggi-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 385 days.

(21) Appl. No.: 12/755,592

(22) Filed: Apr. 7, 2010

(65) Prior Publication Data

US 2010/0258971 A1 Oct. 14, 2010

(30) Foreign Application Priority Data

Apr. 8, 2009 (KR) .......................... 10-2009-0030282

(51) Int. Cl.
*B05D 3/12* (2006.01)

(52) U.S. Cl.
USPC ........... 427/355; 264/132; 264/219; 264/227; 427/356; 427/357; 427/359; 427/360

(58) Field of Classification Search
USPC ................. 427/355, 356, 357, 358, 359, 360, 427/402, 407.1; 264/129, 132, 219, 227
See application file for complete search history.

(56) References Cited

U.S. PATENT DOCUMENTS

| | | | |
|---|---|---|---|
| 2004/0029030 A1* | 2/2004 | Murray | 430/130 |
| 2004/0071880 A1* | 4/2004 | Su | 427/258 |
| 2007/0026205 A1* | 2/2007 | Anton et al. | 428/195.1 |
| 2008/0019083 A1* | 1/2008 | Lim et al. | 361/679 |
| 2008/0213546 A1* | 9/2008 | Murata et al. | 428/195.1 |

OTHER PUBLICATIONS

"Painting Techniques: Sgraffito".http://web.archive.org/web/20060207124905/http://painting.about.com/od/paintingforbeginners/ss/Sgraffito.htm, Feb. 7, 2006, last viewed May 5, 2012.*

* cited by examiner

*Primary Examiner* — Michael Cleveland
*Assistant Examiner* — Alexander Weddle
(74) *Attorney, Agent, or Firm* — Cha & Reiter, LLC

(57) ABSTRACT

A method for manufacturing hairlines in an apparatus case frame is provided. The method includes forming the case frame having primary hairlines being expressed throughout a relevant mold, coating the primary hairlines with a predetermined paint material, coating the primary hairlines to form a coated surface and scratching the coated surface to form secondary hairlines, the scratching being one of at regular and irregular lines.

15 Claims, 5 Drawing Sheets

METHOD FOR MANUFACTURING HAIRLINE ELEMENTS IN CASE FRAMES

CLAIM OF PRIORITY

This application claims the benefit of the earlier filing date of, under 35 U.S.C. §119, that patent application Serial No. 10-2009-0030282 filed in the Korean Intellectual Property Office on Apr. 8, 2009, the contents of which are incorporated by reference in its entirety.

BACKGROUND OF THE INVENTION

1. Field of the Invention

The present invention relates to case frame manufacturing. More particularly, to a method for manufacturing hairlines within a case frame to create elegant designs therein.

2. Description of the Related Art

To improve the appeal of products to users, more esthetic designs are being applied to the products case frame. The case frames, which define an outer surface of the product or apparatus, are being designed with more elegant and appealing to the user by performing a surface processing. Examples of the surface processing include a hairline processing. Generally, a hairline processing represents the drawing of one or more thin lines on a metal plate, such as aluminum and stainless steel. The hairline processing prevents glaring caused by the high shine and glossy surface of the metal, hides or reduces the noticeability of scratches or damages in the surface, and makes a metal product more appealing and elegant. As high-priced digital home appliances become more popular and in their demand increases, it becomes important that such products include visual characteristics that represent sophistication and elegance design. Thus, surface processing techniques and equipment for performing hairline processing are constantly being improved upon to realize increased esthetic demands.

FIG. 1 is a cross-sectional view of a series of processes schematically illustrating a conventional method for hairline processing.

Referring to FIG. 1, which are represented as (Process A)-(Process C), a metal plate 100 of a predetermined shape is prepared through well-known blanking and punching processes (process A). The metal plate 100 has a surface 101 on which the hairline surface process is to be performed and which is to be exposed to the outside. Defects in, or foreign material(s) on, the surface 101 may be removed using a buffing machine with a sand paper facing. After that, the surface 101 is processed to become hairlines 102 using a predetermined tool (process B). The tool used for the hairline processing may be a brush, a sand paper, a luffa, etc. During the hairline processing, the tool may cut the surface 101 to form regular and/or irregular hairlines. For example, in a cross-section corresponding to line S-S illustrated in the plate 100, a depth cut by the tool is irregular. In addition, the cut depth may be regular or irregular also in, in a direction normal to the cross-section (i.e., a lengthwise direction of the plate). After that, the hairlines 102 are coated with a predetermined paint material 110. Preferably, the paint material 110 is coated to a predetermined thickness on the hairlines 102 to form a coated surface 111 that can effectively express irregularities of the hairlines 102 (process C).

The hairline processing method, shown by processes A to C, is generally applied to only a metal whose surface hardness is relatively low (for example, aluminum, magnesium, etc.). In the case where the metal case frame is used for an electronic apparatus, a current may leak to the case frame. Furthermore, the conventional method for processing hairlines forms hairlines in the metal plate 100 through a post process of the processes B and C (FIGS. 1B, 1C). Therefore, since the conventional method for processing hairlines highly depends on the post process, the processing yield fall, which results in increased costs.

FIG. 2 illustrates a case where a defect occurs when the conventional method for processing hairlines described in FIG. 1 is applied to a metal or non-metal plate.

Referring to FIG. 2, the conventional method for processing hairlines described in FIG. 1 may process hairlines as illustrated in the process C of FIG. 1. However, as illustrated in FIG. 2, hairlines 102 formed in advance may not be coated with a predetermined paint material 120 of predetermined thickness in all areas. Thus, the coated surface 121, having unequal depths in some areas, may not properly express the hairlines 102.

In addition, the conventional method for processing hairlines illustrated in FIG. 1 may be similarly applied to a non-metal plate. For example, a surface of a non-metal plate forms a surface in which hairlines have been formed using corrosion, electroforming, a laser, etc. instead of means such as a brush, a sand paper, etc. as described with the regard to the process illustrated in FIG. 1. After that, the surface in which the hairlines are formed is coated with a predetermined paint material. FIG. 2 may, thus, also illustrate hairlines formed using corrosion, electroforming, a laser, etc. that are buried within the predetermined paint material, and are not properly expressed. That is, fine irregularities of the hairlines vanish due to the uneven thickness of paint material in some areas. Therefore, patterns a little thicker than fine patterns need to be formed in a non-metal material using a processing such as corrosion, electroforming, a laser, etc. Therefore, it is difficult to properly express fine hairlines using the method for processing the non-metal plate using means such as corrosion, electroforming, a laser, etc., and consequently, texture of a real metal surface cannot be expressed.

SUMMARY OF THE INVENTION

The present invention provides a method for manufacturing hairlines that allows a non-metal case frame of an apparatus to have a texture of a metal surface close to a real metal.

An exemplary aspect of the present invention is to provide a method for manufacturing hairlines by raising the yield of a non-metal case frames and, thus, for reducing processing costs In accordance with an exemplary aspect of the present invention, a method for manufacturing hairlines is provided. The method includes forming wholly an apparatus case frame having first hairlines, and coating the first hairlines with a paint material to express second hairlines.

In accordance with another exemplary aspect of the present invention, a method for processing case frame defining an outer surface of an apparatus is provided. The method includes forming the case frame having primary hairlines being expressed throughout a relevant mold, coating the primary hairlines with a paint material predetermined thickness to form a coated surface and scratching at least one of regularly and irregularly depths within the coated surface to form secondary hairlines.

Other exemplary aspects, advantages and salient features of the invention will become apparent to those skilled in the art from the following detailed description, which, taken in conjunction with the annexed drawings, discloses exemplary embodiments of the invention in more detail.

BRIEF DESCRIPTION OF THE DRAWINGS

The above and other exemplary objects, features and advantages of the present invention will be more apparent from the following detailed description taken in conjunction with the accompanying drawings in which.

Throughout the drawings, like reference numerals will be understood to refer to like parts, components and structures.

DETAILED DESCRIPTION

The following description, with reference to the accompanying drawings, is provided to assist a person of ordinary skill in the art with an understanding of exemplary embodiments of the present invention as defined by the appended claims. The description includes various specific details to assist in that understanding, but these details are to be regarded as merely exemplary. Accordingly, those of ordinary skill in the art will recognize that various changes and modifications of the exemplary embodiments described herein can be made without departing from the scope and spirit of the invention as defined by the appended claims. Also, descriptions of well-known functions and constructions may be omitted for conciseness and so as not to obscure appreciation of the present invention by a person of ordinary skill with such well-known functions and constructions.

The terms and words used in the following description and claims are not limited to the bibliographical meanings, but, are merely used by the inventor to enable a clear and consistent understanding of the invention as understood by a person of ordinary skill in the art. Accordingly, it should be apparent to those skilled in the art that the following description of exemplary embodiments of the present invention are provided for illustration purpose only and not for the purpose of limiting the invention as defined by the appended claims.

It is to be understood that the singular forms "a", "an", and "the" include plural references unless the context clearly dictates otherwise. Thus, for example, reference to "a component surface" typically includes reference to one or more of such surfaces.

By the term "substantially" typically means that the recited characteristic, parameter, or value need not be achieved exactly, but that deviations or variations, including for example, tolerances, measurement error, measurement accuracy limitations and other factors known to those skilled in the art, may occur in amounts that do not preclude the effect the characteristic was intended to provide.

Preferred exemplary embodiments of the present invention will now be described below with reference to the accompanying drawings.

Exemplary embodiments of the present invention provide a method for processing a surface of a case frame defining an outer surface of an apparatus. More particularly, the present invention discloses an improved technology for a hairline processing method for reducing costs in expressing desired hairlines.

Figure 1:
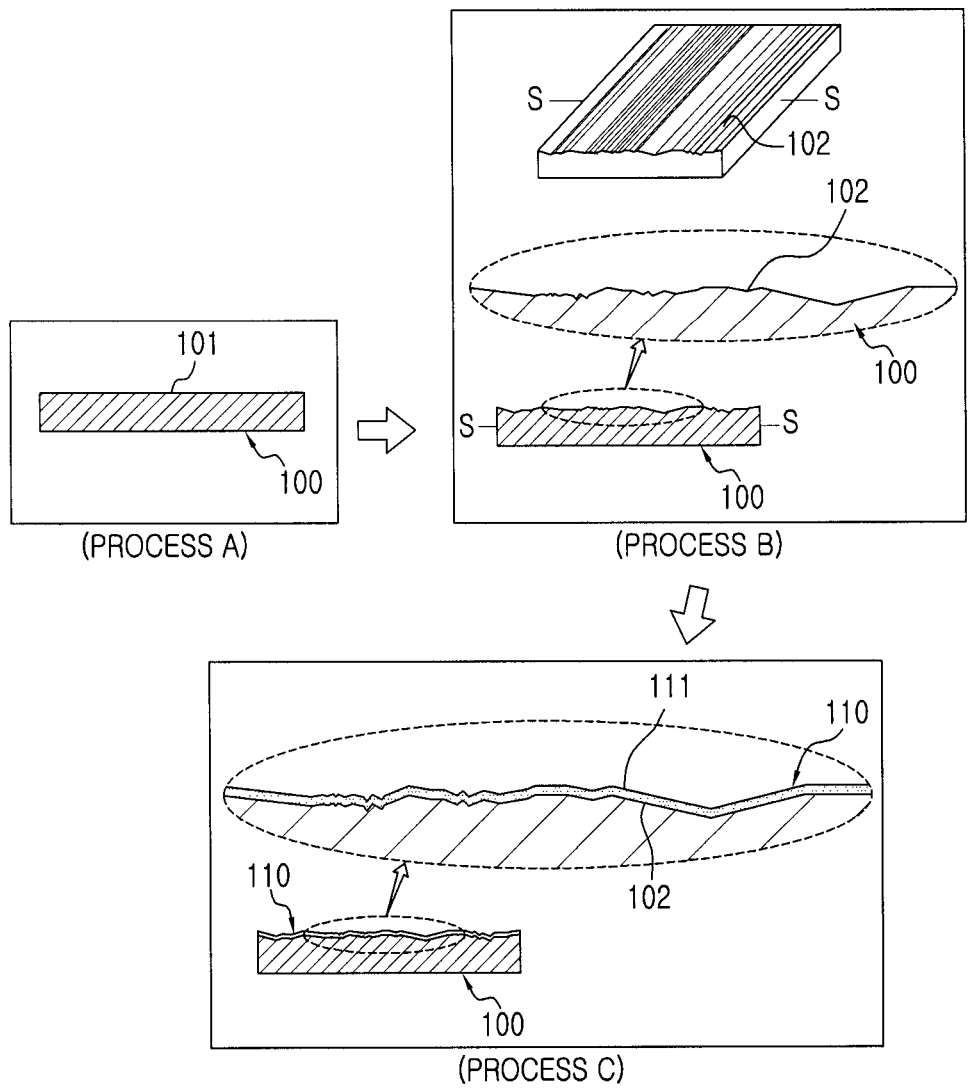
FIG. 1 is a cross-sectional view of a series of processes schematically illustrating the conventional method for processing hairlines.
Figure 2:
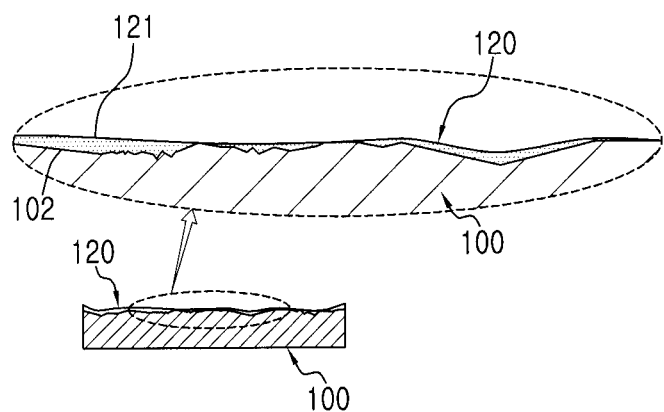
FIG. 2 illustrates the case where a defect occurs when the conventional method for processing hairlines described in FIG. 1 is applied to a metal or non-metal plate.
Figure 3:
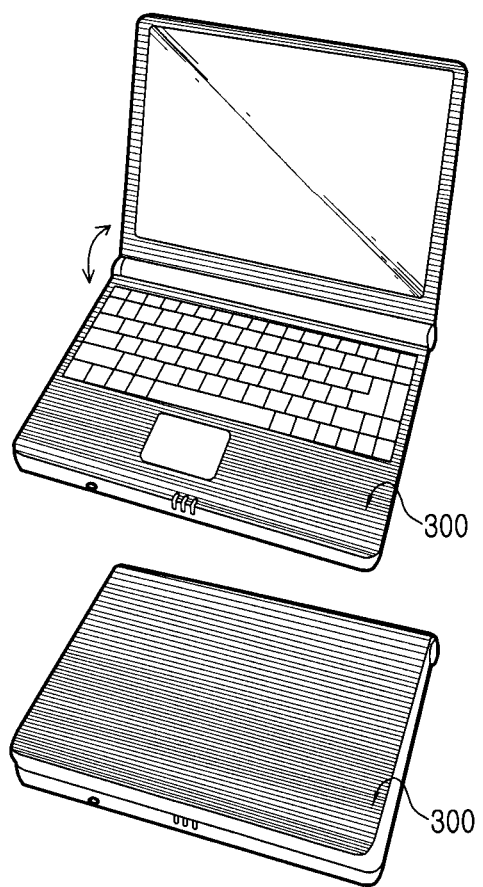
FIG. 3 is a view illustrating a portable computer whose appearance is formed by an extruded plastic case frame formed by a method for processing hairlines according to an exemplary embodiment of the present invention.

FIG. 3 is a view illustrating a portable computer whose appearance is formed by an extruded plastic case frame formed by a method for processing hairlines according to an exemplary embodiment of the present invention. A method for processing hairlines according to an exemplary embodiment of the present invention may provide a visual effect such as a metal plate to which the conventional method for processing hairlines has been applied using even a plastic extrusion material, (i.e., a non-metal).

FIGS. 4A-4G (collectively FIG. 4) illustrate a method for processing hairlines according to an exemplary embodiment of the present invention.

Figure 4A:
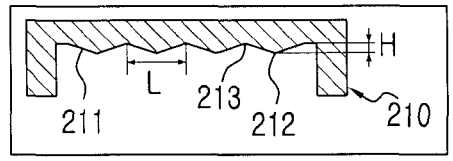
FIGS. 4A-4G illustrate a method for processing hairlines according to an exemplary embodiment of the present invention.

Referring to FIG. 4A, a mold for extruding an extruded material for defining an outer surface of an apparatus is manufactured first. Here, the mold includes a cavity mold 210 providing irregularities for forming the first hairlines in an appearance of the extruded material, and a core mold 220 (process C, FIG. 4C) for forming a forming space when combined with the cavity mold 210. The cavity mold 210 includes a pre-hairline crest 211 having a height difference of a depth H as measured from a surface of the cavity mold 210. The crests 211 may be spaced apart regularly periodically or a-periodically from each other. Pre-hairline crest 211 may be formed through a laser beam machining and that like (process A, FIG. 4A). The pre-hairline crest 211 of the mold forms a first hairline 231 of an extruded material 230 (FIG. 4D, 4E). More particularly, an irregular depth of the pre-hairline 211, that is, a distance between a valley 232 and a crest 233 of the extruded material 230 (FIG. 4E) needs to be formed with consideration of a thickness of a paint material which will be described later. That is, the intended irregular shape of the already formed first hairline 231 should not be allowed to vanish when covered by a paint material that paints the irregularity of the first hairline 231 of the extruded material 230 to an irregular or regular thickness at least one time. That is because the paint material flows into the valley 232 from the crest 233 of the first hairline 231, the thickness in the valley 232 may be greater that the thickness on the crest 233. For example, the irregularity depth H may be about 20-50 μm, not 10 μm or less. Furthermore, the irregularity of the cavity mold 210 includes a valley 213 and a crest 212 (FIG. 4A), and an interval between the valley 213 and a neighbor valley, or between the crest 212 and a neighbor crest may be constant. At this point, the mold needs to be designed with attention to an extrusion defect that may occur during extrusion. Examples of the extrusion defect include incomplete forming, an air bubble, shrinking, a weld line, etc. Since causes of extrusion defects are known in the art, description of such defects is therefor omitted. Furthermore, extrusion defects may be resolved using the known arts such as optimization of a cooling line, application of a mold division core, etc.

After that, the irregularity of the pre-hairline 211 of the cavity mold 210 is polished using a micro blasting (process A, FIG. 4A). By doing so, a material that is extruded into the cavity mold 210 may overcome a surface tension and flow up out of the valley 213 of the irregularity. Furthermore, by doing so, the paint material may overcome a surface tension and flow out of the valley 232 (process E, FIG. 4E) of an extruded material extruded from the mold formed by the polishing of the irregularity.

Next, the above-described relevant core mold 220 is formed (process C, FIG. 4C), and a material is extruded from the mold (process D, FIG. 4D), so that a relevant extruded material 230 is obtained (process E, FIG. 4E). The extruded material 230 includes the first hairline 231 corresponding to the pre-hairline 211 of the polished irregularity of the cavity mold 210. The irregularity includes the valley 232 and the crest 233, and an interval L between the valley 232 and a neighbor valley. Alternatively, the interval between the crest 233 and a neighbor crest may be regular. The extruded material 230 may be stored and moved using a method of attaching a transparent protective film to the irregularity in order to prevent the surface irregularity from being scratched.

Figure 4B:
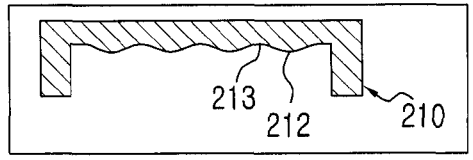
Figure 4D:
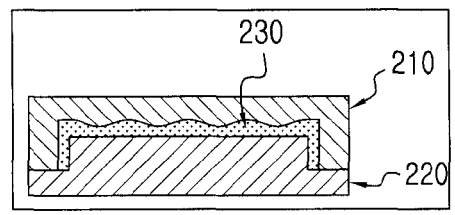
Figure 4C:
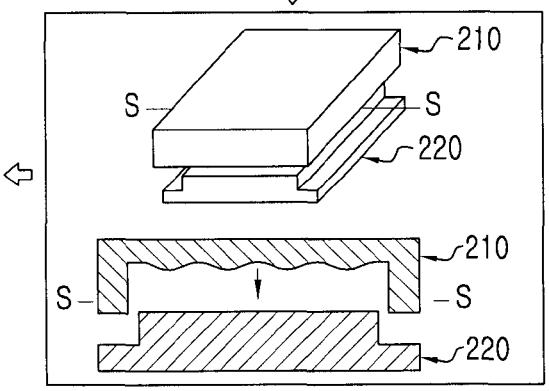
Figure 4E:
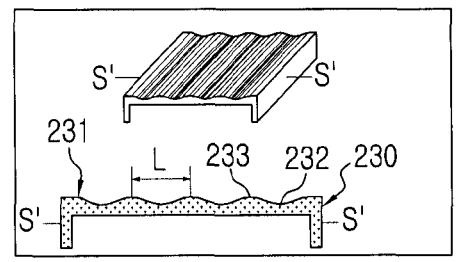

Though processes A and B as shown in FIGS. 4A-4B, respectively, show that a relevant case frame is formed using extrusion by a mold, the forming of the case frame is not to be limited thereto and an case frame where hairlines having irregularities may be formed using various forming techniques. For example, it may be one of a casting, a die casting, an impression, an extruding, a rolling, a forging, a sheet working, a form rolling and an injection molding.

Figure 4F:
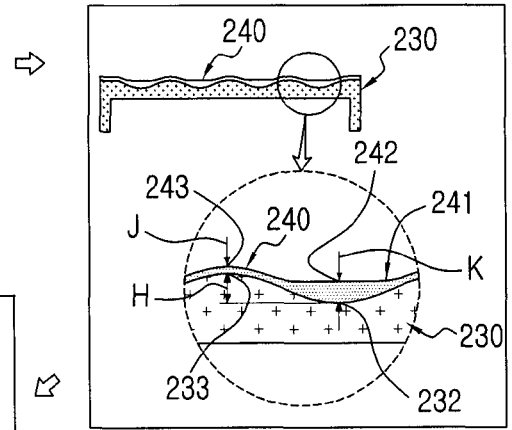

After that, the extrusion material 230 is coated with a paint material 240 of a predetermined thickness at least one time (process F, FIG. 4F). The paint material is coated on the first hairline 231 of the extruded material 230 to a predesigned thickness, and the second hairline 241 is formed. At this point, the paint material 240 is coated on the hairline 231 to a uniform thickness with respect to a relevant area, so that the pre-hairline intended from a manufacturing process of the molds 210 and 220 may be formed. However, thicknesses of the paint material 240 coated on the crest 233 and the valley 232 of the first hairline 231 may differ. For example, a portion of the paint material 240 may flow from the crest 233 to the valley 232 and may be collected there during a coating process. At this point, as described above, after the painting is completed, the sum of the depth H of the irregularity and the thickness J of the paint material coated on the crest 233 may be greater than the thickness K of the paint material coated on the valley 232. Therefore, the second hairline 241 is irregular. That is, it is not preferable that the first hairline 231 used to intentionally represent the pre-hairline 211 from the manufacturing process of the molds 210 and 220 is buried due to the paint material 240.

Figure 4G:
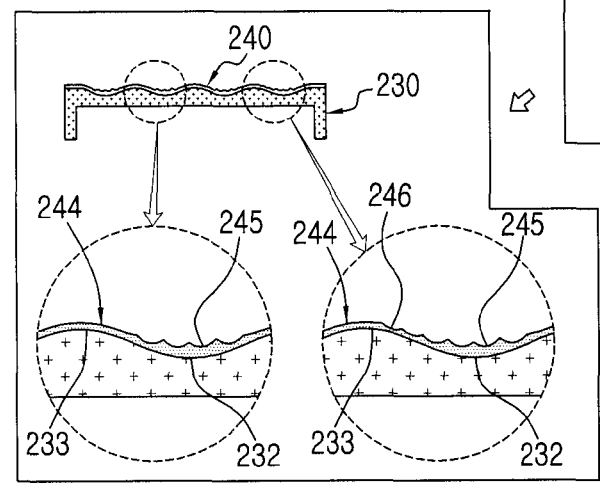

Furthermore, the third hairline 244 may be expressed on the second hairline 241 of the paint material 240 using a predetermined hairline tool (process G, FIG. 4G). For example, the extruded material 230 where the paint material 240 is coated is fixed to a jig. After that, the paint material 242 coated on the valley 232 may be partially cut using a scratch roller having fine protrusions. In addition, the scratch roller may partially cut the paint material 242 coated on the valley 232 and the paint material 243 coated on the crest 233. Furthermore, during the process F (FIG. 4F), a brush containing metal powder may be used as a replacement for the scratch roller. During the process F (FIG. 4F), the extruded material 230 is preferably not cut. Therefore, the third hairline 244 including cutting portions 245 and 246 may be even more elegantly expressed.

As described above, after relevant molds are manufactured in the processes A and B, a series of processes from D to F, and further to G may be collectively performed, which is efficient in aspects of costs and time of manufacturing hairlines within a case frame.

Figure 5:
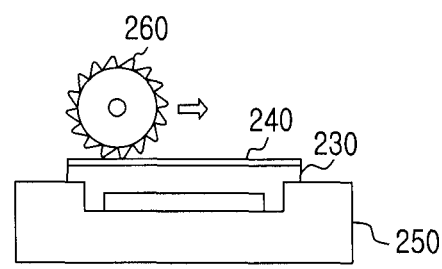
FIG. 5 is a view illustrating an exemplary embodiment of a secondary hairline forming process performed during a process shown in FIG. 4.

FIG. 5 is a view illustrating an exemplary embodiment of a secondary hairline forming process performed during a process G of FIG. 4.

The extruded material 230 extruded to intentionally express the primary hairlines during a manufacturing process of a mold is coated with a relevant paint material 240 so as to form the second hairline. After that, the coated extruded material 230 is fixed to a jig 250. Next, the paint material 240 coated on the extruded material 230 for forming the second hairline is cut using the above-described scratch roller 260 so that the third hairline are expressed.

A method for processing hairlines according to an exemplary embodiment of the present invention raises processing yield and, thus, reduce costs, and more particularly, may allow a non-metal apparatus to have a texture of a metal surface close to a real metal.

While the invention has been shown and described with reference to certain preferred exemplary embodiments thereof, it will be understood by those skilled in the art that various changes in form and details may be made therein without departing from the spirit and scope of the invention as defined by the appended claims and their equivalents. Therefore, the scope of the invention is defined not by the detailed description of the invention but by the appended claims, and all differences within the scope will be construed as being included in the present invention.

What is claimed is:

1. A method for manufacturing hairlines in an apparatus case frame, the method comprising:
   forming, using a mold, the apparatus case frame having first hairlines including first crests extending from a surface of the apparatus case frame;
   coating the first hairlines with a paint material, wherein the paint material forms second hairlines maintaining the contours of the first crests on the surface; and scratching periodically or aperiodically a surface of the second hairlines to form third hairlines.

2. The method of claim 1, wherein the mold comprises:
   a cavity mold having mold protrusions for forming the first hairlines in the apparatus case frame to be extruded, and
   a core mold for determining a volume of the apparatus case frame when coupling with the cavity mold.

3. The method of claim 2, wherein the mold protrusions of the cavity mold have a depth less than 50 μm (microns).

4. The method of claim 2, wherein the paint material is coated on respective surfaces of the first hairlines to a uniform thickness on the surfaces less than 10 μm (microns).

5. The method of claim 3, further comprising polishing the mold protrusions within the mold.

6. The method of claim 1, wherein the forming the apparatus case frame having the first hairlines uses a process including one of casting, die casting, making an impression, extruding, rolling, forging, sheet working, form rolling and injection molding.

7. The method of claim 1, wherein scratching the second hairlines to form the third hairlines cuts the second hairlines to a depth of 5-15 μm (microns).

8. The method of claim 1, wherein scratching the second hairlines to form the third hairlines uses one of a scratch roller having protrusions on a circular surface, and a brush containing metal powder.

9. The method of claim 8, wherein the predetermined mold comprises:
   a cavity mold having mold protrusions for forming the first hairlines in the case frame to be extruded; and
   a core mold determining a volume of the terminal when coupled with the cavity mold.

10. A method for processing a case frame defining an outer surface of a terminal, the method comprising:
- forming the case frame having a surface and first hairlines including first crests extending from the surface and formed using a predetermined mold;
- coating the first hairlines with a predetermined paint material to form a coated surface on the first hairlines, wherein the paint material maintains the contours of the first crests on the surface; and
- forming additional hairlines by scratching the coated surface, with the additional hairlines including additional crests, wherein the scratching includes one of: periodic or aperiodic line depths.

11. The method of claim 10, wherein forming the first hairlines uses a process including one of casting, die casting, making an impression, extruding, rolling, forging, sheet working, form rolling and injection molding.

12. The method of claim 10, wherein the first hairlines comprise the first crests of a depth less than 50 μm (microns).

13. The method of claim 10, wherein the paint material is coated on respective surfaces of the first hairlines to a uniform thickness on the surfaces less than 10 μm (microns).

14. The method of claim 10, wherein the forming of the additional hairlines includes forming aperiodic features of the second hairlines of depths of 5-15 μm (microns).

15. The method of claim 10, wherein the forming of the additional hairlines comprises one of: using a scratch roller having protrusions on a circular surface, and using a brush containing metal powder.

* * * * *

UNITED STATES PATENT AND TRADEMARK OFFICE
CERTIFICATE OF CORRECTION

PATENT NO. : 8,455,052 B2
APPLICATION NO. : 12/755592
DATED : June 4, 2013
INVENTOR(S) : Jae-Sung Sun Page 1 of 1

It is certified that error appears in the above-identified patent and that said Letters Patent is hereby corrected as shown below:

In the Claims:

Column 6, Claim 6, Lines 50-51 should read as follows:
"...wherein forming the apparatus..."

Signed and Sealed this
Fifteenth Day of October, 2013

Teresa Stanek Rea
*Deputy Director of the United States Patent and Trademark Office*